April 11, 1967   J. W. KINNAVY ETAL   3,313,634
CORROSION BARRIER AND INHIBITOR COATING AND METHOD
Filed April 1, 1964
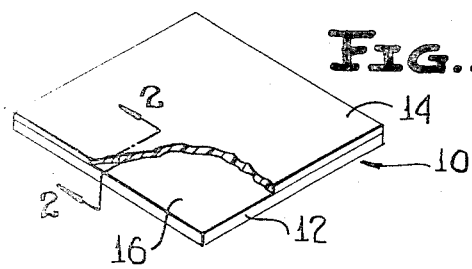
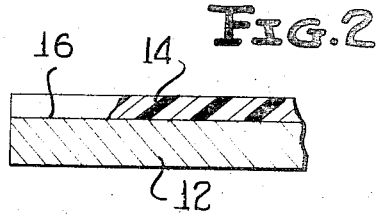
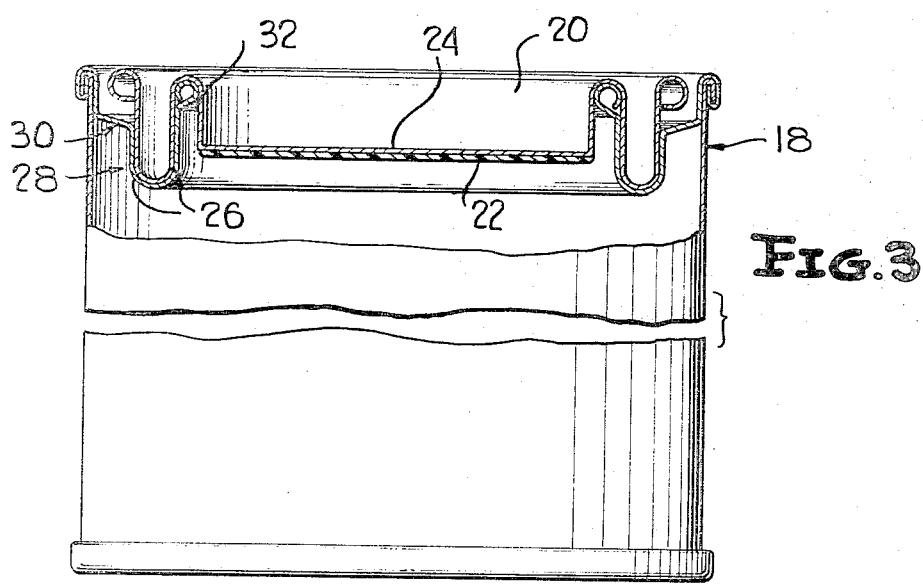
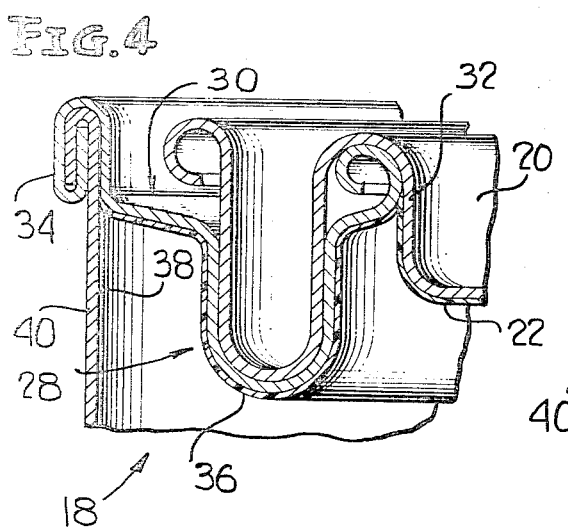
INVENTORS
JAMES W. KINNAVY
& EARL D. GIGGARD
BY
ATTORNEYS

3,313,634
CORROSION BARRIER AND INHIBITOR COATING AND METHOD

James W. Kinnavy, Oaklawn, and Earl D. Giggard, Clarendon Hills, Ill., assignors to Continental Can Company, New York, N.Y., a corporation of New York
Filed Apr. 1, 1964, Ser. No. 356,523
18 Claims. (Cl. 106—14)

This invention relates to a coating material for metals which when applied and baked onto a metal substrate both provides a barrier against aqueous corrosive substances and functions as an inhibitor against corrosive action on exposed parts of the metal substrate.

More specifically, the coating composition contains a major portion of a metal salt and a minor portion of a semi-drying oil, as solids, taken up in a volatile inert organic solvent. The metal salt consists of a metal cation having a stable plus two valence state coupled with two anions from the group of naphthenate, tallate and octoate.

As used in the above statements, the word "barrier" refers to the function of the baked coat to separate the metal substrate from surrounding corrosive substances by acting as a continuous separation plane. The word "inhibitor" refers to the action of the baked coat to inhibit chemical corrosion of exposed portions of the metal substrate. That is, of two metal substrate areas in close proximity and contacted by a corrosive substance, in which one of the areas is coated with the novel protective coat of the present invention, and one of the areas is exposed, this latter area will be protected against corrosion by reason of the chemical interaction of the metal salt incorporated into the baked layer with the corrosive substances and the exposed metal surface.

In the past many heavy metal salts of organic acid anions have been employed as driers for semi-drying oils and drying oils, such as China-wood oil. These driers are thought to have a catalytic effect upon the formation of peroxide groups with the double bonds of the unsaturated oils and to thereby increase the oxygen takeup during the induction period of the curing process. For such applications the amount of drier needed is very small when compared to the amount of unsaturated oil for which it acts as a catalyst. The presence of such low concentrations of the metal salts by such applications furnishes no inhibitor effect and the resulting coating only provides a barrier against corrosive substances. These concentrations are generally no greater than 5 weight percent.

Another employment of similar metal salts has been in high concentrations together with various oil and paraffin base solvents to provide a "slush" coating for various surfaces. Generally, these "slush" coatings are only partially solidified and, therefore, are not compatible with many substances which tend to be corrosive to metal surfaces; particularly, in applications where the metal substrate forms a part of a container for the material having the corrosive effect. Chromium naphthenate has been used in such a manner but this salt has the chromium cation which exhibits two stable valence states rather than having only a single valence state as required by the present invention. The variable valency conditions of the metal anions which have been used in the prior art is thought to be a partial explanation for the lack of an "inhibitor" effect by such prior art statements.

The prior art has also utilized various metal naphthenates as in situ corrosion inhibitors in petroleum products such as greases and oil. Certain other prior art conflicts with such usage in stating that the embodiment of metal naphthenates in such products are corrosive. Studies have generally supported the last of this body of developing art.

In such coatings provided by the prior art with which there is a considerable proportion of the solids components represented by such metal salts, there has been no particular concern with the adhesion qualities of the resulting coating or the physical properties after the same has been placed upon the metal substrate. That is, when the coating compositions are placed upon the metal substrate and then treated to their final state, the physical properties exhibited by the coats and their respective adhesions to the metal substrate shows much variation and in many instances characteristics which seriously limit the use of the resulting coating. Generally, such coatings are limited to use with metal surfaces which are not bent or flexed in any manner and which do not come into direct contact with other solid bodies, hence limiting their uses to metal parts which are static in fluid systems.

It is, therefore, an object of the present invention to provide coats for metal substrates which provide both a barrier plane against corrosive substances and which provide an inhibition effect to the corrosion of exposed metal parts in close association with the coated metal parts. The coat of the present invention exhibits great adhesion to the metal substrate and exhibits easy employment with present coating techniques and, when baked, exhibits flexibility which permits later fabrication of the metal substrate material. By reason of the fabrication characteristics of the coat of the present invention, flat metal substrate stock may be coated with the corrosion barrier and inhibitor layer and later cut and stamped into desired shapes and forms to allow greater utility. Therewith, a much lower production cost for such formed and shaped articles is attained than if the layers could only be coated on the preformed and shaped metal parts.

Another object of the present invention is to provide a method of forming a corrosion barrier and inhibitor coating for metal to protect a surface thereof from corrosion, particularly by aqueous substances, by performing the steps of, first forming a mixture of a metal salt of naphthenic acid in which the metal anion has a stable or normal plus two valence state and a semi-drying oil, both in a volatile solvent. Thereafter a layer of the mixture is placed onto a metal substrate in a wet thickness sufficient to have 0.5 mgs. per square inch of solids components and baked at a curing temperature for a time sufficient to render the same substantially non-tacky. The forming step of this object has a proportion of salt to semi-drying oil in the range of 75:25 to 70:30 by weight.

Yet a further object of the present invention is to provide a method of forming a corrosion barrier and inhibitor coating for metal surfaces by first forming a mixture of a metal salt selected from the class of metal naphthenates, tallates and metal octoates, that is, metal salts having anions of the specified type, in which the metal cation has a stable or normal plus two valence state with a semi-drying oil in a volatile inert organic solvent. Thereafter a layer of the mixture is placed on a metal substrate in a wet thickness sufficient to have 0.5 mg. per square inch of solids components and thereafter baked at a curing temperature for a time sufficient to render the same substantially non-tacky and therewith present a coating having a coating weight corresponding to the above.

Yet another object is to provide a method of preparing a curable coating composition for forming a corrosion barrier and inhibitor coating for metal by baking said composition on a metal surface by performing the steps of, first forming a mixture of a metal salt of naphthenic acid in which the metal cation has a stable plus two valence state and a semi-drying oil in a volatile inert organic solvent in the weight proportion of metal salt to semi-drying oil of 75:25 to 70:30. Thereafter placing the layer on the metal substrate in a coating weight as above and baking the same to substantially non-tacky conditions.

Another object is to provide a method of preparing a curable coating composition as in the above object wherein the composition is formed by mixing a metal salt having the anions thereof selected from the class of naphthenates, tallates and octoates and in which the metal cation has a stable plus two valence state, together with a semi-drying oil, both in a volatile inert organic solvent.

Yet another object of the present invention is to provide a curable coating composition for metals to protect the surface thereof from corrosion by aqueous substances by forming upon baking a corrison barrier and inhibitor layer. The composition comprises in a volatile inert organic solvent a metal salt of naphthenic acid in which said metal cation has a stable valence state of plus two and a semi-drying oil in the proportion range of 25:75 to 30:70 by weight with respect to the metal salt. A preferred solids content to attain this object is 64 weight percent solids in the volatile inert organic solvents.

An object following the above is to provide a curable coating composition for metals in which the metal salt has the anion radical thereof selected from the class of napthenate, tallate and octoate and in which the metal cation has a stable valence state of plus two.

Another object of the present invention is to provide a metal article formed of a metal substrate and thereon a coat of the baked residue of a mixture comprising a metal salt of naphthenic acid in which the metal cation has a stable valence state of plus two and a semi-drying oil in the weight proportion of 25:75 to 30:70 with respect to said metal salt. To attain the corrosion barrier and inhibitor properties according to the present invention the coat of the baked residue has a dry coating weight of at least 0.5 mg. per square inch.

Yet another object is to provide a metal article formed of a metal substrate which is protected against corrosion by a coat of the baked residue of a mixture comprising a metal salt having the anion radical thereof selected from the class of naphthenate, tallate and octoate and in which the metal cation has a stable valence state of plus two, together with a semi-drying oil in the above weight proportions and dry coating weight.

To attain the objects the preferred metal salt when a metal salt of naphthenic acid is employed is calcium napthenate. A salt which shows less effectiveness is zinc naphthenate and another which shows still less inhibitor effect is cobalt naphthenate. For various employments, these may be selected according to their relative inhibitor effects.

A second class of metal salts are those having the anions selected from the class of tallates and octoates. The coating compositions resulting from the employment of such metal salts do not show the superior coating characteristics and fabrication qualities as do the metal salts of the naphthenic acids above. However, such metal salts may be employed for many uses, particularly where the metal substrate is not to be bent and flexed around small radii in later fabrication steps. The inhibitor action of the tallate and octoate metal salts varies in the same manner as described for the above naphthenic acid salts.

Thus another object of the present invention is to provide a coat for metal substrates which may have the composition thereof varied according to the intended employment of the coated article. A high degree of fabrication of the coated metal, together with a high inhibition effect against aqueous corrosive substances, can be attained. A high inhibitor effect together with low fabrication qualities can be attained, and low inhibition effect with both high and low fabrication qualities can be attained in the metal coating of the present invention.

A preferred semi-drying oil, according to the present invention, is soya bean oil which exhibits an iodine value of 122–134. A preferred organic solvent is mineral spirits which may be volatilized off during the initial baking step.

These and other objects will become explicit from the following description and drawing in which:

FIGURE 1 illustrates a metal article formed of a metal substrate and a coating of the baked residue of the composition of the present invention;

FIGURE 2 is a cross-sectional view of FIGURE 1 on line 1—1;

FIGURE 3 illustrates a metal container and closure in partial sectional view having a portion of the interior closure surface coated with the novel corrosion barrier and inhibitor composition;

FIGURE 4 is a detailed sectional view of a portion of the container of FIGURE 3 and illustrates that other interior portions may be coated with the novel composition; and FIGURE 5 is a modification of the container of FIGURE 4 in which a portion of the container body is coated.

Referring now to FIGURE 1, a metal article 10 is shown which is formed by a metal substrate portion 12 and a partial coating 14. An exposed metal portion 16 is shown at one corner thereof for purposes of illustrating the present invention. FIGURE 2 shows a cross-sectional view of the coated metal article and therewith shows the metal substrate 12, the corrosion barrier and inhibitor coat 14 and the exposed metal surface 16.

The novel coating composition 14, when baked onto the metal substrate 12, provides a barrier plane against penetration of corrosive aqueous substances which would otherwise contact the substrate metal. The coating 14 also provides an inhibiting effect to corrosion occurring on exposed surface 16 of coated article 10. That is, the presence of the coating composition 14 in the near vicinity of exposed surface 16, by reason of the high concentration of metal salt in the coating 14, protects the exposed surface 16 against corrosion by the corrosive substances which are present in contact with the coated article 10.

A commercial employment of the novel coating of the present invention is shown in FIGURE 3 wherein a triple tight metal container is shown having a portion of the interior surface of the closure or cover 20 coated with a composition of the present invention. Such containers as shown in FIGURE 3 have been long used by the paint industry to transport aqueous based paints, such as polyvinyl acetate and latex base paints. These aqueous based paints tend to be corrosive when coming into contact with the exposed metal portions of the container 18. Such corrosive action is particularly acute in the head-space of the metal cans illustrated by the sectional view of FIGURE 3. It is in this portion of the metal container 18 that protection against corrosion by such aqueous substances is needed.

As shown in FIGURE 3, cover or closure 20 has a layer 22 of the composition according to the present invention on the interior surface of bottom wall 24. The direct presence of the coating 22 over the bottom wall 24 protects the same against contact with the corrosive paints by reason of acting as a barrier layer. In addition, the presence of the corrosive inhibiting layer 22 on the interior surface of the bottom wall 24 protects the inner wall 26 of the U-shaped channel 28 and the ring-shaped can top 30 from significant corrosive action. Thus, it has been found that by coating the interior surface of bottom wall 24 with the novel coating composition of the present invention, protection is provided for substantially all parts of the closure structure, including the vertical wall 32 of cover 20 and the exposed portions of the U-shaped channel 28 forming the can top 30. This corrosion inhibition is due to the high concentration of the particular metal salt incorporated into the layer 22.

FIGURE 4 shows in detail a modification of the coated inner surface of FIGURE 3. The coating 22 may be extended upwardly to cover vertical wall 32 of closure 20 and therewith an extensive coating from the top of U-shaped channel 28 to the double seam 34 can be placed upon the continuous portion of the ring-shaped can top 30. The resulting coating 36 is shown in continuous cross-section over the exposed surfaces of the ring-shaped top 30. The presence of the extensive coating layer 22 and 36 have been found effective to inhibit corrosion on the interior surface 38 of body wall 40 of the container 18.

For a complete all-over protection of the headspace part of container 18 an interior coat 42 may be provided over a portion or the entire inner surface of body portion 40. This all-over coating may then be combined with the continuous coating as shown in FIGURE 4 to present the entire inner surface of the metal with a corrosion barrier and inhibiting coat which then effectively prevents any corrosive action from occurring by reason of the substances contained in, stored and marketed in the metal container 18.

The novel coating compositions of the present invention may be applied to a planar metal substrate, such as 12 shown in FIGURE 1, and then baked. Thereafter, the coated metal may be formed into container elements, such as closure 20 and container end 30 and body portion 40 of FIGURES 3 and 4. The ability to bend and form the metal into various container element shapes when the coating composition is present on the metal surfaces is considerably enhanced due to the good adhesion of the coating to the metal substrate and its good fabrication qualities which is identified by having similar flexing characteristics to the metal itself.

Such coatings have been applied directly on #25 basebox tinplate (0.00275 in. thick) and over this #25 tinplate which has been previously enameled and thereafter formed into container shapes. In neither of these employments was the effectiveness of the coating against headspace corrosion seriously limited. That is, some crazing and cracking occurs during the bending and forming operation and therewith exposing metal surface such as illustrated schematically by exposed surface 16 of FIGURE 1, but such small areas did not corrode due to the inhibiting action of the metal salts leached out of the coating by the aqueous based paints which are then in the corrosive substance and limit its corrosive effect. Corrosion of pinhole areas which occur with many coating techniques is likewise inhibited.

Due to the fact that the body portion 40 of FIGURE 5 is not worked, that is, bent and fabricated around small radii, as is the container closure 20 and the container end 30, a coat of less fabrication suceptibility can be employed. Therewith, coatings having less fabrication qualities can be employed for such surfaces in order to effect a more economical product.

The coatings illustrated in the drawings should be at least 0.5 mg. per square inch in thickness when later fabrication is to be performed upon the metal substrate. A lower coating weight tends to be abraded during the fabrication and therewith a thinner film which does not afford the inhibition against corrosive materials is presented. For areas in which low metal working is intended, such as body portion 40 in FIGURE 5, a somewhat lower coating weight can be employed.

In order to form baked coatings which are neither tacky nor are overly brittle, the proportion of metal salt to semi-drying oil must be carefully controlled. It has been found that by employing the semi-drying oils having characteristics similar to soya bean oil and by employing the metal salts of the present invention, a proportion range of 70:30 to 75:25 of the metal salt to the semi-drying oil meets both criteria. That is, the coating is non-tacky when baked and still possesses flexibility to permit later fabrication. Therewith, it is believed that the semi-drying oil employed operates as a plasticizer for the metal salts and prevents the same from being overly brittle. The efficient plasticizing effect occurs only over the range set out.

In the following examples parts are by weight unless otherwise specified.

*Example I*

| Components: | Parts |
| --- | --- |
| Calcium naphthenate | 55 |
| Soya bean oil | 24 |
| Mineral spirits | 45 |

The calcium naphthenate was first mixed with the mineral spirits in which it was soluble. Thereafter, the soya bean oil was added and thoroughly mixed. The resulting coating composition in its wet state was then coated onto planar stock by brushing, dipping, slushing or spraying and was then baked at a temperature for a time sufficient to render the same substantially non-tacky. The wet coating composition was applied to the metal in a thickness so that the resulting dry baked coat had a coating weight of at least 0.5 mg. per square inch.

The baked coating was substantially non-tacky and had flexibility properties great enough to permit fabrication into container components such as those of FIGURES 3-5 of the drawing. The weight ratio of calcium naphthenate to soya bean oil in this coating was 70:30 and, thus, the 30% of the semi-drying oil provided very good flexibility and metal adhesion.

*Example II*

| Components: | Parts |
| --- | --- |
| Calcium naphthenate | 55 |
| Soya bean oil | 18 |
| Mineral spirits | 45 |

The wet coating composition was prepared as in Example I and then coated onto a metal sheet of #25 tinplate. The coated tinplate, while in planar configuration, was then baked until the coating was non-tacky. The proportion of calcium naphthenate to soya bean oil was 75:25 by weight which gave extremely good inhibition properties when fabricated into a closure member for a container such as closure 20 of container 18 shown in FIGURE 3. The large proportion of calcium naphthenate permitted leaching out of some of the calcium naphthenate by the aqueous base paint which then decreased the corrosive action of said paint.

The coating weight as in the above Example I was such that a dry coating weight of at least 0.5 mg. per square inch was attained.

The coating weights may vary upwardly from 0.5 mg. per square inch but greater than 2 milligrams per square inch serve no additional purpose and, therefore, are usually uneconomical. Such greater coating weights do not impair the usefulness of the present invention.

*Example III*

| Components: | Parts |
| --- | --- |
| Zinc naphthenate | 55 |
| Soya bean oil | 24 |
| Mineral spirits | 45 |

The above components were mixed, coated and baked as in Examples I and II in order to furnish a comparison therewith.

The resulting coating showed some decrease in inhibition properties for exposed metal surfaces in the near vicinity of the coated metal surfaces but remain of good flexibility and metal adhesion, thereby permitting fabrication of the underlying metal substrate.

*Example IV*

| Components: | Parts |
|---|---|
| Cobalt naphthenate | 55 |
| Soya bean oil | 24 |
| Mineral spirits | 45 |

The above components were mixed, coated and baked as in Examples I and II and a resulting coating compared qualitatively with the above results. The coating showed lower inhibition properties than either of the coatings of Examples I and II and lower than the coating of Example III. However, the inhibition properties were still present and if small metal areas were exposed, as by crazing or cracking, during fabrication, the coating was still sufficient to provide protection. Therewith, continuous coating of headspace parts such as shown by FIGURE 4, is possible by the use of the composition of Example IV. This was due in part to the good flexibility properties which were presented by this coating which compared favorably with the above coatings.

*Example V*

A series of coating procedures such as that described in the above examples in which the various metal salts employable by the present invention were compared one to another. In order to standardize the results, the same semi-drying oil was employed. This standardizing substance was soya bean oil. Also, the same volatile inert organic solvent of mineral spirits was employed. The proportions of Example I were used and therewith a 64% solids solution in the mineral spirits resulted.

A series of coatings was made up with the metal salts resulting from utilizing cations of calcium, zinc, and cobalt and from utilizing anions of tallate and octoate. These coatings were then compared for qualitative properties with the coating of Example I. The results are set forth in Table I.

TABLE I

| Metal Salt | Semi-drying Oil | Inhibition Properties | Flexibility and Metal Adhesion |
|---|---|---|---|
| Calcium Naphthenate | Soya Bean Oil | Excellent | Excellent. |
| Calcium Tallate | do | do | Fair. |
| Calcium Octoate | do | do | Do. |
| Zinc Tallate | do | Good | Do. |
| Zinc Octoate | do | do | Do. |
| Cobalt Tallate | do | Fair | Do. |
| Cobalt Octoate | do | do | Do. |

Thus, it is seen by Table I that the inhibition properties vary with respect to the particular cation which is employed. The calcium salts represent the optimum in inhibition properties, whereas the zinc and cobalt salts vary, respectively, with lower inhibition properties. The flexibility properties of the resulting coating, vary according to the anion employed. Thus, naphthenate salts represent the optimum in flexibility and metal adhesion, whereas the tallate and octoate metal salts are fair in these properties.

Thus, by the present invention, components may be selected to present varying properties with respect to corrosion inhibition and flexibility and metal adhesion and therewith a coating may be selected for a range of particular employments.

In the above examples and in the coatings of the present invention other semi-drying oils may be employed. Generally, the semi-drying oils found useful have iodine values between 100 to 135. Included within this range is the soya bean oil of the above examples, sesame oil and pumpkinseed oil. Other synthetic oils having like iodine values may be employed. The close range of iodine values exhibited by such drying oils indicates a similarity of chemical function in the induction of oxygen to form peroxide groups prior to curing.

In order to facilitate the faster curing of the semi-drying oils employed, small, catalytic amounts of other active driers for the oils may be employed as an expedient.

The present invention has demonstrated that continuous barrier-type coatings are not necessary for corrosion protection of metal surfaces against corrosive substances. When proper metal salts are selected for incorporation into the protective coatings, an "inhibition" effect is established which successfully prevents deleterious corrosive action.

By the present invention inhibitor coatings may be formed which possess esthetic characteristics of container coatings which provide customer appeal in addition to the other favorable fabrication and corrosive protection properties.

The volatile inert organic solvents which may be used are generally of the non-polar type. Mineral spirits being the preferred solvent.

It is obvious that the illustrative classes are not restrictive; and that the invention can be practiced in many ways within the scope of the appended claimed subject matter.

We claim:

1. The method of forming a corrosion barrier and inhibitor coating for metal to protect a surface thereof from corrosion by aqueous substances comprising the steps of forming a mixture of a metal salt having the anion radical thereof selected from the class of naphthenate, tallate and octoate and having a metal cation radical which has a valence state of plus two and a semi-drying oil having an iodine value between 100 to 135 in a volatile inert organic solvent, the proportion of salt to semi-drying oil of said forming step in the range of 75:25 to 70:30 by weight, placing a layer of the mixture on a metal substrate in a thickness sufficient to have a dry coating weight of at least 0.5 mg. per square inch, and baking the layer at a curing temperature for a time sufficient to render the same non-tacky.

2. The method of claim 1 in which the anion radical of the metal salt is naphthenate.

3. The method of claim 1 in which the metal cation of the salt of said forming step is calcium ion.

4. The method of claim 1 in which the metal cation of the salt of said forming step is zinc ion.

5. The method of claim 1 in which the metal cation of the salt of said forming step is cobalt ion.

6. The method of claim 1 in which the semi-drying oil is soya bean oil.

7. The method of claim 1 in which the metal salt of said forming step is calcium naphthenate.

8. A curable coating composition for metal to protect the surface thereof from corrosion by aqueous substances by forming upon baking a corrosion barrier and inhibitor layer comprising in a volatile inert organic solvent a metal salt having the anion radicals thereof selected from the class of naphthenate, tallate and octoate and in which the metal cation radical has a valence state of plus two, and a semi-drying oil having an iodine value between 100 to 135 in the proportion range of 25:75 to 30:70 by weight with respect to said metal salt.

9. The curable coating composition of claim 8 in which the anion radical of said metal salt is naphthenate.

10. The curable coating composition of claim 8 in which said metal salt is naphthenate.

11. A metal article formed of a metal substrate and thereon a coat of the baked residue of a mixture comprising a metal salt having the anion radical thereof selected from the class of naphthenate, tallate and octoate and having a metal cation radical which has a valence state of plus two, and a semi-drying oil having an iodine value between 100 to 135 in the weight proportion of 25:75 to 30:70 with respect to said metal salt, said coat having a dry coating weight of at least 0.5 mg. per square inch.

12. The article of claim 11 in which the anion radical of said metal salt is naphthenate.

13. The metal article of claim 11 in which said semi-drying oil is soya bean oil.

14. The metal article of claim 11 in which the metal cation of said metal salt is calcium ion.

15. The metal article as in claim 11 in which the metal cation of said metal salt is zinc ion.

16. The metal article as in claim 11 in which the metal cation of said metal salt is cobalt ion.

17. The article of claim 11 in which said metal salt is calcium naphthenate.

18. The article of claim 11 in which said metal substrate is a portion of the interior headspace surface of a metal container.

References Cited by the Examiner

UNITED STATES PATENTS

| | | | |
|---|---|---|---|
| 2,554,826 | 5/1951 | Harvey | 117—167 |
| 3,132,034 | 5/1964 | Mayer | 106—264 |

ALEXANDER H. BRODMERKEL, *Primary Examiner.*

MORRIS LIEBMAN, DONALD J. ARNOLD, *Examiners.*

T. MORRIS, *Assistant Examiner.*